United States Patent
Birckhead

(10) Patent No.: US 6,419,011 B1
(45) Date of Patent: Jul. 16, 2002

(54) ANNULAR SHAPED INTERRUPTED SOLENOID ACTIVATOR AND PUMP FOR BOREHOLE SUBSEA USE (BEI-0002)

(75) Inventor: John Birckhead, Spring, TX (US)

(73) Assignee: BEI Technology, Houston, TX (US)

( * ) Notice: Subject to any disclaimer, the term of this patent is extended or adjusted under 35 U.S.C. 154(b) by 0 days.

(21) Appl. No.: 09/126,507

(22) Filed: Jul. 30, 1998

Related U.S. Application Data

(60) Provisional application No. 60/058,100, filed on Sep. 5, 1997.

(51) Int. Cl.[7] .......................... E21B 43/00; F04B 17/04; H10H 51/22; H10F 7/08
(52) U.S. Cl. ...................... 166/105; 166/66.4; 417/417; 335/81; 335/228
(58) Field of Search .......................... 335/81, 228, 229, 335/230, 232; 417/417, 416; 166/68, 105, 66.4

(56) References Cited

U.S. PATENT DOCUMENTS

| | | | | |
|---|---|---|---|---|
| 1,304,843 A | * | 5/1919 | Zacharias | |
| 1,989,057 A | * | 1/1935 | Kongsted | |
| 3,451,031 A | * | 6/1969 | Darr | 338/32 |
| 4,142,166 A | * | 2/1979 | Arnoux | 335/81 |
| 4,223,290 A | * | 9/1980 | Agatahama et al. | 335/229 |
| 4,553,118 A | * | 11/1985 | Agatahama | 335/79 |
| 4,768,595 A | * | 9/1988 | Smith | 166/369 |
| 5,567,131 A | * | 10/1996 | McNaull | 417/417 |
| 5,620,048 A | * | 4/1997 | Beauquin | 166/62 |

FOREIGN PATENT DOCUMENTS

| | | | |
|---|---|---|---|
| JP | 58-3205 | * | 1/1983 |
| JP | 58-4903 | * | 1/1983 |

* cited by examiner

*Primary Examiner*—David Bagnell
*Assistant Examiner*—Jennifer Dougherty
(74) *Attorney, Agent, or Firm*—Moser, Patterson & Sheridan, L.L.P.

(57) ABSTRACT

An interrupted annular solenoid activator for use in well or subsea tools is provided. An interrupted annular armature member of a ferromagnetic material has a wire coil wound about it. A separate curved annular segment of the generally toroidally shaped armature is mounted for axial motion in the direction of the axis of revolution of the annular toroidally shaped member. Passage of electrical current through the coil causes axial motion (reciprocal) of the separate annular curved segment. This motion is coupled to a hydraulic pump piston in a preferred embodiment.

18 Claims, 3 Drawing Sheets

ANNULAR SHAPED INTERRUPTED SOLENOID ACTIVATOR AND PUMP FOR BOREHOLE SUBSEA USE (BEI-0002)

RELATED APPLICATIONS

This application corresponds to Provisional U.S. patent application Ser. No. 60/058,100 filed Sep. 5, 1997 and claims benefit of the filing date thereof under 35 U.S.C. 119(e).

FIELD OF INVENTION

This invention relates to activators for use in a well borehole or subsea environment, and more particularly, to electrically powered activators for initiating mechanical motion such as in a hydraulic fluid pump.

BACKGROUND OF THE INVENTION

In oilfield practice, and particularly in the practice of offshore well drilling and completions, it has become more usual than unusual to have multiple well completions in a single borehole. Multiple well completions may be made at different depth levels in a single well borehole or multiple well bore holes may be drilled offset from a single central well borehole with perforations and completions in each of the offset wells. When this is done, a central passageway through well packers or other well tools disposed in the borehole, such as valves, pumps, or the like is usually required or desired to permit passage of tubing to each of the wells and/or completion levels in a single well borehole. Thus, an annular shape about such a central passageway for well tools, pumps, packer activation mechanisms, etc. which provides a central unobstructed passage therethrough has become a desired geometrical shape. Such an annular or toroidal shape about a central passage is provided in a solenoid activator and in a hydraulic pump in the present invention.

DESCRIPTION OF THE PRIOR ART

Typically in the prior art, annular solenoid coils (i.e. fully annular) such as that disclosed in U.S. Pat. 4,579,177 have been proposed for borehole use. In this patent a fully annular solenoid coil is used to move an annular armature member (which is also fully annular and concentric therewith) against a spring bias in a well tool. By fully annular it is intended to mean that the solenoid coil being described has an overall toroidal shape which is not interrupted for the full 360 degrees of its circumference about a central passage therethrough. This is to distinguish the geometry of the present invention which employs an interrupted annular shape. By interrupted annular shape it is intended to mean that a non continuous toroidal member is described which has a gap, or is interrupted, in its circumference about a central passage therethrough. If the axis of revolution of the toroid is taken as the axial direction, then the interrupted annular shaped object has a segment which is capable of axial motion with respect to the other portion of its body.

BRIEF DESCRIPTION OF THE INVENTION

In the interrupted annular solenoid activator of the present invention the best use of the available volume or space in the annular wall of a well tool, pipe or other tubular structure is made. Solenoids have been wound toroidally about an actuator core which is concentric with the wire coil. Solenoids constructed in this manner as described in the U.S. Patent above generally take the form of a cylindrical volume filled with, for example, an armature or an actuator rod and an external body or air, to form a return path for the magnetic field. In the present invention an interrupted annular shaped first member of iron (or other magnetic material) forms the core of a wire coil wrapped thereabout to form an interrupted annular shaped solenoid core. The interrupted segment in the annular shaped solenoid core is generally a curved wedge shaped section or member thereof. This wedge shaped (curved) segment is capable of axial movement. This member may be fabricated of a permanent magnetic material having a desired north or south polarity. In another embodiment of the invention, this member may be ferromagnetic and spring biased. The passage of electrical current (either AC or DC) through the wire coil wound about the interrupted annular shape solenoid core causes a magnetic field of either constant (in the case of DC) magnetic polarity or varying magnetic polarity in the case of AC current in the core. This magnetic field attracts or repels the wedge shaped section or segment and causes axial motion of this member as it is mounted in the apparatus to allow such axial motion. In the case of passage of DC current through the coil, the wedge shaped member is attracted and held in a fixed position until the current removed or reduced. A return spring or the like may be employed to then cause reciprocal axial motion to return the wedge shaped member to its starting position.

In the case of an AC current being passed through the wire coil and using a permanent magnetically polarized material for the wedge shaped segment, the magnetic polarity of the wedge shaped member being constant, it is alternately attracted and repelled by the polarity of the AC magnetic field induced in the interrupted annular shaped first member. In either case of AC or DC activation the reciprocal axial motion of the wedge shaped member may be utilized to activate motion or propel other moving parts or systems.

In one particular preferred embodiment the axial motion of the wedge shaped segment is used to power the piston of a hydraulic pump used to supply hydraulic fluid under pressure to other hydraulic mechanisms in a well tool system in the borehole. The interrupted annular solenoid segment in this embodiment moves the piston and compresses springs which, upon their release, force the piston in the opposite direction. Thus a reciprocating motion is imparted to the piston for moving the hydraulic fluid.

The invention may best be understood by reference to the following detailed description thereof when taken in conjunction with the appended drawings, in which:

DETAILED DESCRIPTION OF THE INVENTION

Figure 1:
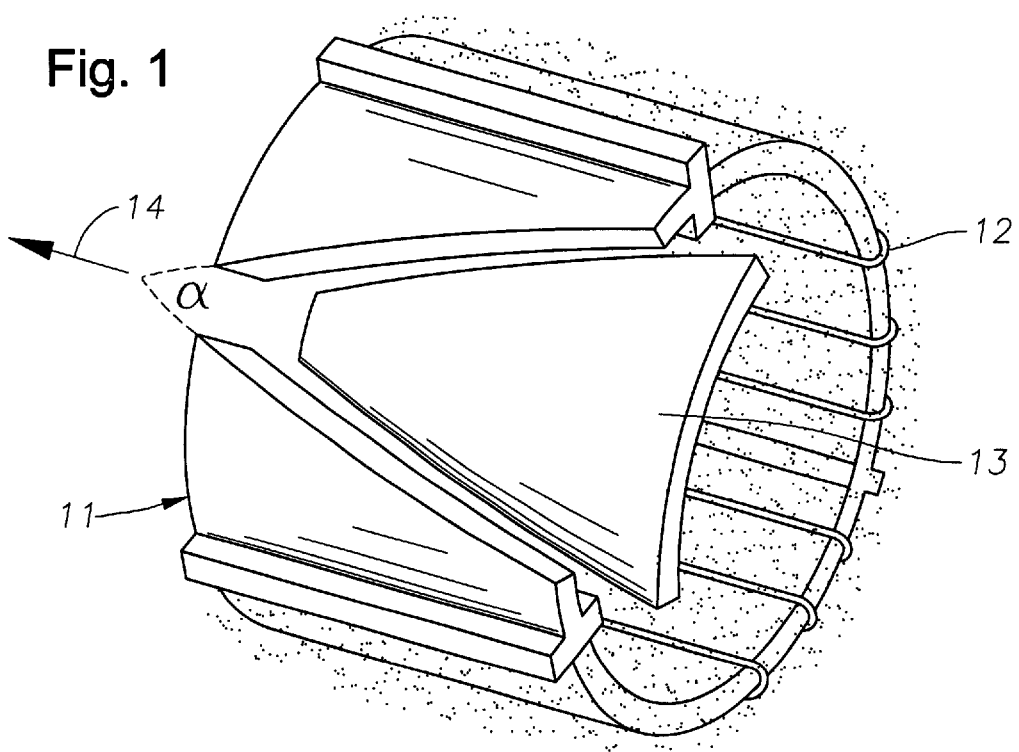
FIG. 1 is a schematic three dimensional view showing one embodiment of the interrupted annular solenoid activator of the invention.

Referring now to FIG. 1 a first interrupted annular member 11 comprises a partial or interrupted toroid constructed of a magnetic material such as iron. A wire coil 12 is wound around the interrupted annular member 11 in the fashion shown in the drawing. A second, curved wedge shaped section or segment 13 is provided and is mounted on rods, for example, (not shown) parallel to the axis of revolution of the first interrupted annular member 11 to allow reciprocal axial motion in the direction of arrow 14. In this embodiment when a DC current is passed through the wire coil 12, the curved wedge shaped member 13 is pulled in the direction of arrow 14 by the magnetic field induced in member 11 and is held in place at the limit of its axial motion until the DC current is reduced or removed. Then return springs, or other return means (not shown) cause the return axial motion of the wedge shaped member of segment 13 to its starting position as shown in the drawing.

Figure 2:
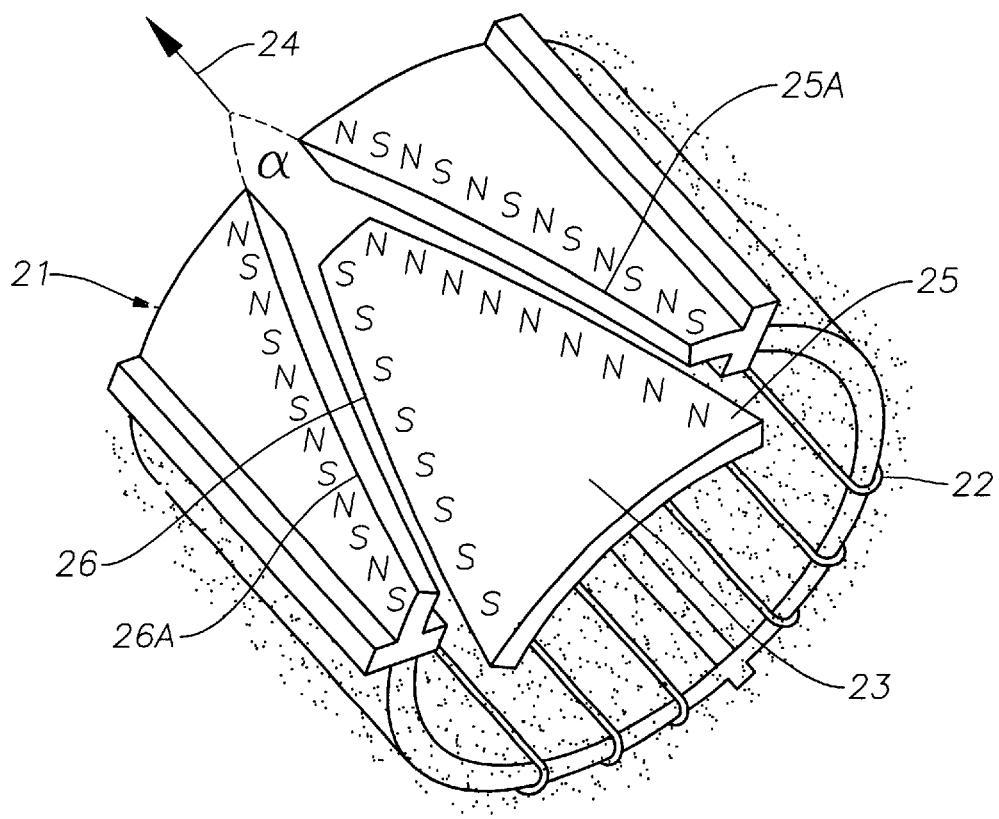
FIG. 2 is a schematic three dimensional view showing a second embodiment of the interrupted annular solenoid activator of the invention.

In FIG. 2 a second embodiment according to the concepts of the present invention is shown. A first interrupted annular member 21 is formed of a magnetic material such as iron. A coil 22 is wound around the interrupted annular member 21 as shown in the drawing. A second, curved wedge shaped member or segment 23 is constructed of a strong permanent magnetic material such as the alloy ALNICO of aluminum, nickel and cobalt, or the like. The polarity (magnetic) of this piece is permanent having a north pole face at 25 and a south pole face at 26. The segment 23 is mounted on axial rods or bearings (not shown) such that it can move reciprocally in the axial direction denoted by arrow 24. When an alternating (AC) current is applied to wire coil 22, the magnetic polarity of interrupted annular member 21 varies in time alternately as shown by the (NS) marking on the faces 25a and 26A of this member in FIG. 2. This polarity reversal alternately attracts and then repels the wedge shaped segment or member 23 at the frequency of the applied AC current. Since the wedge shaped piece 23 is mounted to allow reciprocal axial motion, this causes an axial oscillation of the member 23 which may be coupled to other mechanical components as desired.

Figure 3:
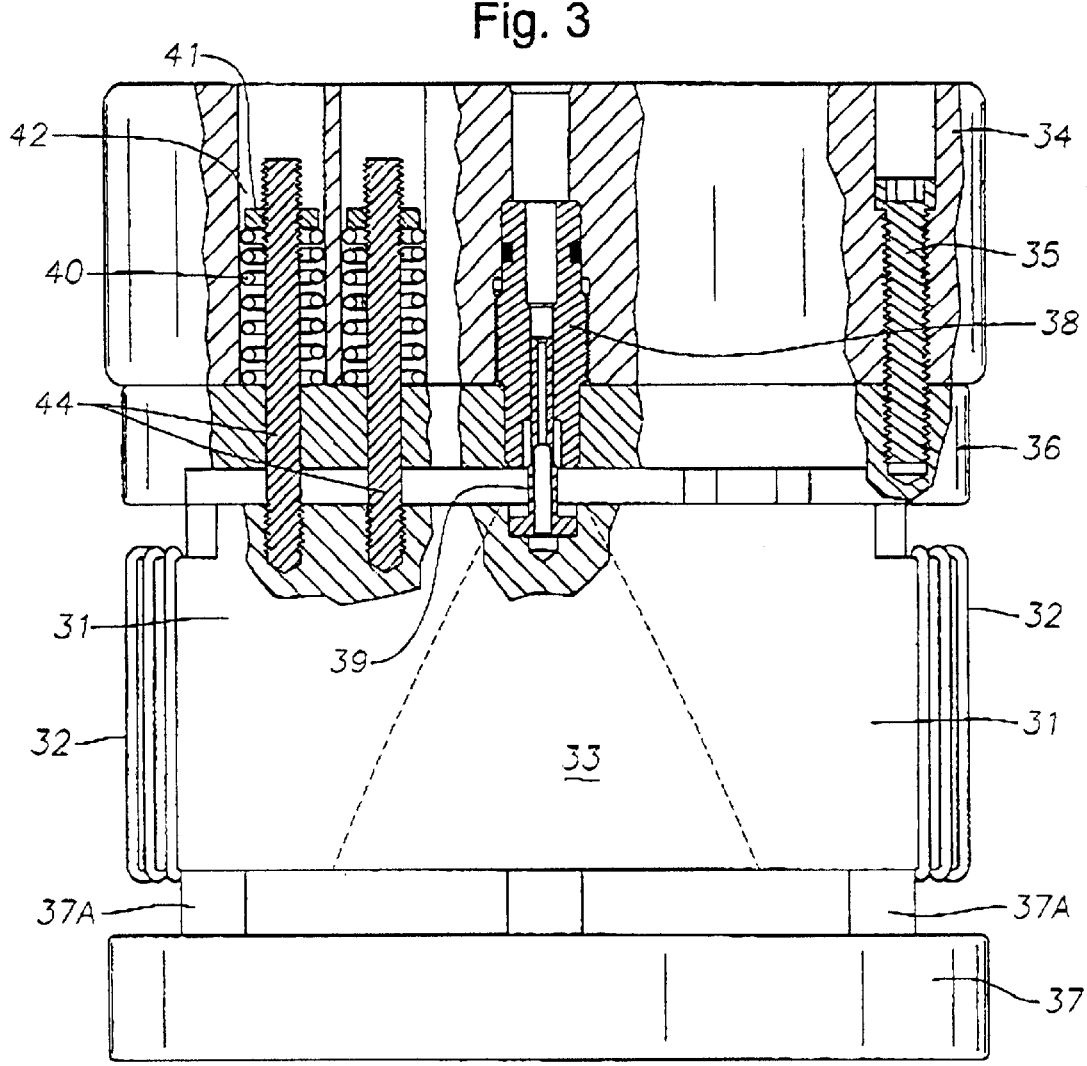
FIG. 3 is a schematic side view, partially in section, showing the interrupted annular solenoid powered hydraulic pump of the invention.
Figure 4:
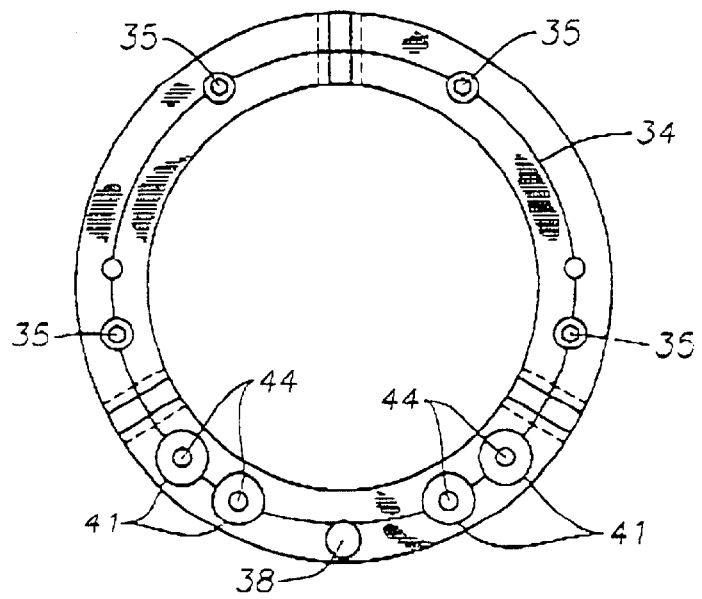
FIG. 4 is a top view of FIG. 3.

Referring now to FIGS. 3 and 4 a hydraulic pump is powered by the reciprocating axial motion of an interrupted annular segment such as that described with respect to FIG. 1. An interrupted ferromagnetic annular solenoid body member 31 is mounted via stand-offs 37A on a secondary bearing ring 37 which is joined by guide pins 44 to a main bearing ring 36. The main bearing ring 36 is secured to a hydraulic pump body member 34 by a plurality of bolts 35.

A plunger member 33 is connected to the separated curved wedge shaped segment of the interrupted annular member 31. A wire coil 32 is wound about the member 31 and connected to a source of electrical power (not shown). The plunger member 33 is mechanically coupled to a piston 39 which extends upwardly into a cylinder 38 in pump body 34. The arrangement is such that when electrical current is passed through the coil 32, the plunger 33 is mounted on rods 44 to move downwardly (axially) and compresses plural springs 40 disposed in a plurality of recesses 41 and held onto rods 44 against main bearing 36 by plural lock nuts 42. Cessation of current in coil 32 allows springs 40 to return to their uncompressed state. This reciprocal axial motion is imparted to the piston 39.

Figure 5:
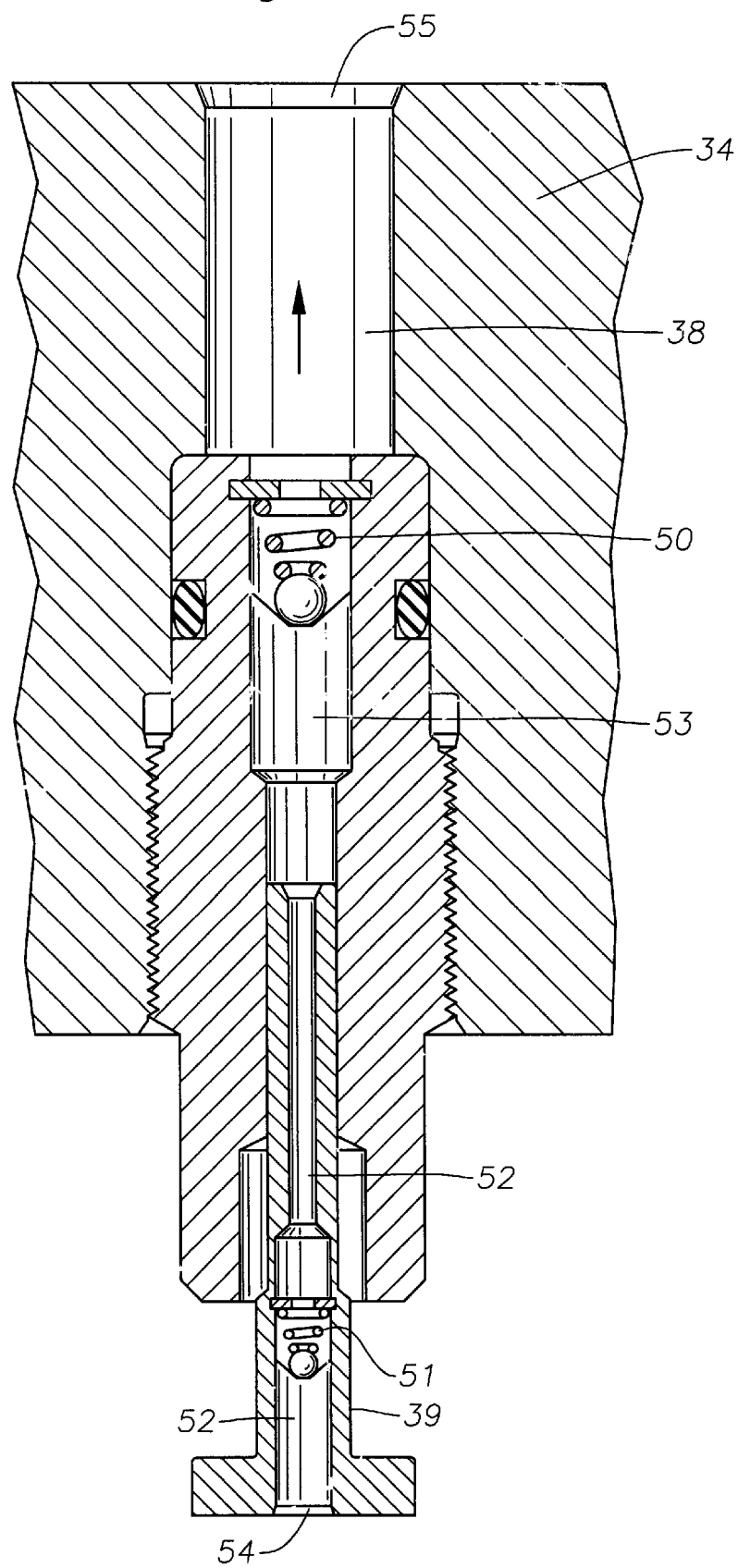
FIG. 5 is a schematic side view in section showing more detail of the piston of the pump of FIG. 3.

Referring now to FIG. 5, a more detailed view of the cylinder 38 in pump body member 34. A hydraulic fluid input is provided at one end of the piston 39 which has a bore 52 extending longitudinally therethrough. A ball/cage type check valve 51 allows hydraulic fluid to flow into bore 52 and past valve 51 on the down stroke of piston 39. At this time the increased pressure from above (due to the diameter difference between bores 52, 53 and output bore 55) forces ball/cage check valve 50 to its closed position. On the up stroke of piston 39 valve 51 closes and valve 50 opens. The piston 39 moving up forces fluid in bore 53 past valve 50 to the output 55 under pressure due to the difference in bore 53 and bore 55 diameter, etc. Thus on the spring powered upstroke fluid is pumped under pressure from input 54 to output 55. This pressurized hydraulic fluid may be used for a variety of purposes, as desired, in the well tool in which the entire assembly of FIGS. 3, 4, and 5 is housed.

While particular embodiments of the present invention have been described, these may make other alternative arrangements apparent to those of skill in the art. For example, the angle α of FIGS. 1 and 2 may be varied to provide different opening and closing forces. The magnitude of electrical currents supplied to the wire coils and their duration and directions can be tailored to specific tasks, etc. All such changes and modifications fall within the true spirit and scope of the invention. It is the aim of the appended claims to cover all such variations.

What is claimed is:

1. A solenoid type actuator for use in the annular wall of a well tool or tubular structure comprising:

a generally toroidally shaped armature member having a wire coil wound about it over less than 360 degrees of its circumference and having an interrupted circumferential portion about which said wire coil is not wound, said interrupted portion being mounted so that it is capable of axial motion in the direction of the axis of revolution of said toroidal armature member.

2. The actuator of claim 1 wherein said armature member is formed of a ferromagnetic material.

3. The actuator of claim 2 wherein said interrupted portion is formed of a ferromagnetic material.

4. The actuator of claim 2 wherein said interrupted portion is formed of a permanent magnetic material.

5. The actuator of claim 1 wherein said interrupted portion is spring biased to return following axial motion.

6. The actuator of claim 1 wherein said interrupted portion is generally curvedly wedge shaped.

7. A solenoid driven hydraulic pump for use in the annular wall of a well tool or tubular structure comprising:

a generally toroidally shaped armature member having a wire coil wound about it over less than 360 degrees of its circumference and having an interrupted circumferential portion about which said wire coil is not wound, said interrupted portion being mounted so that it is capable of axial motion in the direction of the axis of revolution of said armature member;

a mechanical linkage to said interrupted portion for connecting a piston of a hydraulic pump thereto in such a manner as to achieve reciprocal motion of said piston under axial motion of said interrupted portion; and valve means for converting reciprocal motion of said piston to increased hydraulic pressure on fluid in said hydraulic pump.

8. The pump of claim 7 wherein said armature member is formed of a ferromagnetic material.

9. The pump of claim 8 wherein said interrupted portion is formed of a ferromagnetic material.

10. The pump of claim 8 wherein said interrupted portion is formed of a permanent magnetic material.

11. The pump of claim 7 wherein said interrupted portion is spring biased to return following axial motion.

12. The pump of claim 7 wherein said interrupted portion is generally curvedly wedge shaped.

13. A solenoid driven hydraulic pump having a generally annular shape for use in the wall of a well tool or tubular structure comprising:

a generally toroidally shaped armature member having a coil wound over less than 360 degrees of its circumference and having an interrupted curved annular segment mounted for axial motion along the direction of the axis of revolution of said toroidally shaped member and said curved member being spring biased in a direction away from any magnetic attraction from said armature member; and means for connecting said curved annular segment to a hydraulic pump piston, to thereby activate said piston to pump hydraulic fluid.

14. The pump of claim 13 wherein said armature is formed a ferromagnetic material.

15. The pump of claim 14 wherein said curved annular segment is formed of a ferromagnetic material.

16. The pump of claim 14 wherein said curved annular segment is formed of a permanent magnetic material.

17. The pump of claim 13 and further including valve means for converting axial motion of said pump piston to increased pressure on a hydraulic fluid.

18. The pump of claim 17 and further including mechanical linkage means for coupling the axial motion of said curved annular segment to said hydraulic pump piston.

* * * * *